United States Patent
Amtmann (10) Patent No.: US 8,022,813 B2
(45) Date of Patent: Sep. 20, 2011

(54) METHOD OF INVENTORIZING A PLURALITY OF DATA CARRIERS

(75) Inventor: Franz Amtmann, Graz (AT)

(73) Assignee: NXP B.V., Eindhoven (NL)

( * ) Notice: Subject to any disclaimer, the term of this patent is extended or adjusted under 35 U.S.C. 154(b) by 1901 days.

(21) Appl. No.: 10/512,166

(22) PCT Filed: Apr. 9, 2003

(86) PCT No.: PCT/IB03/01440
§ 371 (c)(1),
(2), (4) Date: Oct. 20, 2004

(87) PCT Pub. No.: WO03/091938
PCT Pub. Date: Nov. 6, 2003

(65) Prior Publication Data
US 2005/0173526 A1    Aug. 11, 2005

(30) Foreign Application Priority Data
Apr. 23, 2002    (EP) .................... 02100399

(51) Int. Cl.
*H04Q 5/22* (2006.01)
*G05B 23/02* (2006.01)
*H04W 4/00* (2009.01)
*H04J 3/16* (2006.01)

(52) U.S. Cl. ............ 340/10.2; 340/10.1; 340/10.4; 340/3.51; 340/314; 340/346; 275/385

(58) Field of Classification Search .......... 235/375–386; 340/10.1, 3.51, 10.2, 10.3–10.34, 10.51, 340/572.4, 5.92; 370/310, 314, 346–348
See application file for complete search history.

(56) References Cited

U.S. PATENT DOCUMENTS

| | | | | |
|---|---|---|---|---|
| 5,537,105 A * | 7/1996 | Marsh et al. | | 340/10.32 |
| 5,686,902 A * | 11/1997 | Reis et al. | | 340/10.2 |
| 5,940,006 A * | 8/1999 | MacLellan et al. | | 340/10.1 |
| 6,040,786 A * | 3/2000 | Fujioka | | 340/928 |
| 6,208,635 B1 * | 3/2001 | Altvater et al. | | 370/343 |
| 6,377,203 B1 * | 4/2002 | Doany | | 342/44 |
| 6,784,787 B1 * | 8/2004 | Atkins et al. | | 340/10.4 |
| 6,876,294 B1 * | 4/2005 | Regan | | 340/10.32 |
| 2002/0011921 A1 * | 1/2002 | Amtmann | | 340/10.1 |
| 2002/0175805 A9 * | 11/2002 | Armstrong et al. | | 340/10.31 |

FOREIGN PATENT DOCUMENTS

EP    1197909 A1 *    4/2002
WO    WO 01 57779    8/2001

* cited by examiner

*Primary Examiner* — Benjamin C Lee
*Assistant Examiner* — Michael T Shannon (57) ABSTRACT

In a method of inventorizing a plurality of data carriers (2) with the aid of a communication station (1) communicating in a contact-free way with the data carriers (2), a set (TS(1), TS(2), . . . TS(N), TS(N+1), . . . (TS(K)) of transmission parameters, preferably of time slots (TS) is available, which set comprises a first subset (TS(1) . . . TS(N)) and a second subset (TS(N+1) . . . (TS(K)) wherein inventorizing procedures (MP1, MP2, MP3, . . . ) are performed consecutively and wherein uninventorized data carriers (2) transmit their identification data (ID) to the communication station (1) for the purpose of inventorization only using transmission parameters contained in the first subset and wherein already inventorized data carriers (2) transmit their identification data (ID) to the communication station (1) only using transmission parameters contained in the second subset.

18 Claims, 3 Drawing Sheets

METHOD OF INVENTORIZING A PLURALITY OF DATA CARRIERS

This application claims priority based upon PCT/IB03/01440, filed on Apr. 9, 2003, and EP02100399.1, filed on Apr. 23, 2002.

BRIEF SUMMARY

The invention relates to a method of inventorizing a plurality of data carriers with the aid of a communication station communicating in a contact-free way with the data carriers, wherein inventorizing procedures are performed consecutively and wherein data carriers that are present in a communication area of the communication station generate an identification signal and deliver the identification signal using transmission parameters selectable from a plurality of transmission parameters to the communication station, and wherein the delivered identification signals are received by the communication station, and wherein, for an unambiguous reception of an identification signal of a data carrier in an inventorizing procedure, the communication station generates and delivers an acknowledgement command and said data carrier receives and processes the acknowledgement command.

Furthermore, the invention relates to a data carrier, that is designed for the contact-free communication with a communication station and that comprises an integrated circuit, which integrated circuit comprises the means listed below, namely identification-signal generation means for generating an identification signal and acknowledgement-command detecting means for detecting an acknowledgement command generated by the communication station and transmitted to the data carrier, and transmission-parameter selection means by means of which a transmission parameter can be selected from a plurality of transmission parameters, wherein the generated identification signal can be transmitted to the communication station using the selected transmission parameters.

Furthermore, the invention relates to an integrated circuit for a data carrier that is designed for the contact-free communication with a communication station, which integrated circuit comprises the means listed below, namely identification-signal generation means for generating an identification signal and acknowledgement-command detecting means for detecting an acknowledgement command generated by the communication station and transmitted to the data carrier and transmission-parameter selection means with the aid of which a transmission parameter can be selected from a plurality of transmission parameters wherein the generated identification signal can be transmitted to the communication station using the selected transmission parameter.

A method as cited above in the first paragraph and a data carrier as cited above in the second paragraph are disclosed in the two mutually corresponding patent documents U.S. Pat. No. 5,537,105 A1 and EP 0 494 114 B1. In the known solutions, time slots are defined during every inventorizing procedure, in which time slots the data carriers deliver their identification signals to the communication station, in which process so-called collisions may occur in some time slots and no collisions occur in other time slots and in which process only those data carriers the identification signal of which is transmitted on its own to the communication station in a time slot is acknowledged with an acknowledgement command. In the known solutions, the reception of an acknowledgement command in a data carrier has the consequence that the respective data carrier is set or switched to a quiescent state, in which quiescent state the data carrier can no longer deliver an identification signal to the communication station and, to be specific, for as long as the data carrier is situated in the communication area of the communication station. A data carrier can only be brought out of the above-mentioned quiescent state after a so-called power-on reset, which is the case if the respective data carrier is brought out of the communication area of the communication station and is then brought after a time into the communication area of a communication station, in which case the so-called power-on-reset then takes place. In the known solutions, there is the disadvantage that all the data carriers already inventorized are set to the quiescent state mentioned and can therefore no longer communicate subsequently with the communication station, which has proved disadvantageous in some application cases.

It is an object of the invention to eliminate the problems cited above and to achieve an improved method and an improved data carrier and an improved integrated circuit.

To achieve the object cited, above features according to the invention are provided in a method according to the invention that are such that a method in accordance with the invention can be characterized in the way specified below, namely:

Method of inventorizing a plurality of data carriers with the aid of a communication station communicating in a contact-free way with the data carriers, wherein inventorizing procedures are performed consecutively and wherein data carriers that are present in a communication area of the communication station generate an identification signal and deliver the identification signal using transmission parameters selectable from a plurality of transmission parameters to the communication station, and wherein the delivered identification signals are received by the communication station, and wherein, for an unambiguous reception of an identification signal, of a data carrier in an inventorizing procedure, the communication station generates and delivers an acknowledgement command and said data carrier receives and processes the acknowledgement command and wherein, as a consequence of the processed acknowledgement command, every data carrier that has received and processed an acknowledgement command delivers, during a subsequent inventorizing procedure, a response signal utilizing a certain predetermined transmission parameter to the communication station, which certain predetermined transmission parameter is different from the plurality of transmission parameters, from which a transmission parameter can be selected for transmitting an identification signal to the communication station.

To achieve the object cited above, features according to the invention are provided in a data carrier in accordance with the invention that are such that a data carrier in accordance with the invention can be characterized in the way specified below, namely:

Data carrier that is designed for the contact-free communication with a communication station and that comprises an integrated circuit, which integrated circuit comprises the means listed below, namely identification signal generation means for generating an identification signal and acknowledgement-command detecting means for detecting an acknowledgement command generated by the communication station and transmitted to the data carrier, and transmission-parameter selection means by means of which a transmission parameter can be selected from a plurality of transmission parameters wherein the generated identification signal can be transmitted to the communication station using the selected transmission parameters, and the response-signal generation means for generating a response signal and control means that interact with the response command detecting means and with the transmission-parameter selection means and with the aid of which, as a consequence of the detection of an acknowledgement command by the acknowledgement-command detecting means, the transmission-parameter selection means can be controlled in such a way that the transmission-parameter selection means select a certain predetermined transmission parameter, which certain predetermined transmission parameter is different from the plurality of transmission parameters, from which a transmission parameter can be selected for transmitting the identification signal to the communication station wherein the generated response signal can be transmitted to the communication station using the certain predetermined transmission parameter.

To achieve the object cited above, features according to the invention are provided in an integrated circuit in accordance with the invention that are such that an integrated circuit in accordance with the invention can be characterized in the way specified below, namely:

Integrated circuit for a data carrier that is designed for the contact-free communication with a communication station, which integrated circuit comprises the means listed below, namely identification signal generation means for generating an identification signal and acknowledgement-command detecting means for detecting an acknowledgement command generated by the communication station and transmitted to the data carrier and transmission parameter-selection means by means of which a transmission parameter can be selected from a plurality of transmission parameters wherein the generated identification signal can be transmitted to the communication station using the selected transmission parameter, and response-signal generating means for generating a response signal and control means that interact with the acknowledgement-command detecting means and with the transmission-parameter selection means and by means of which, as a consequence of the detection of an acknowledgement command by the acknowledgement-command detecting means, the transmission-parameter selection means can be controlled in such a way that the transmission-parameter selection means select a certain predetermined transmission parameter, which certain predetermined transmission parameter is different from the multiplicity of transmission parameters, from which a transmission parameter can be selected for transmitting the identification signal to the communication station, wherein the generated response signal can be transmitted to the communication station using the certain predetermined transmission parameter.

By the provision of the features in accordance with the invention, the result is advantageously achieved in a way that can be implemented easily in terms of circuitry and virtually without additional costs that all the data carriers already inventorized with the aid of a communication station can continue to communicate with the communication station even after their inventorization has already taken place, in which connection, however, a clear separation is advantageously ensured between the communication for the purpose of inventorization still to take place and communication after inventorization has already taken place, and specifically, that the communication after inventorization has already taken place takes place by means of transmission parameters other than the communication prior to a completed inventorization. The measures according to the invention achieve the result in a simple way that, for every inventorizing procedure, it is possible to detect whether data carriers already identified are still situated in the communication area of the communication station, and specifically on the basis of the response signals transmitted to the communication station. For example, this can be of great advantage if a predetermined number of containers that are each equipped with a data carrier are provided on a so-called pallet and if the pallet, together with the containers provided thereon, is brought into the area of a communication station and if an inventorizing operation is then performed for the purpose of inventorizing all the data carriers and, consequently, all the containers, in which connection, owing to the measures according to the invention, it is made possible by evaluating the response signals to determine in a simple way that all the data carriers and, consequently, all the containers of the pallet have already been inventorized. Furthermore, it can easily be determined in the case of this application example whether the pallet and the containers and data carriers provided thereon have been moved out of the communication area of the communication station because none of the data carriers already inventorized any longer transmit a response signal to the communication station using the certain predetermined transmission parameter, after which the communication station can arrange for a subsequent pallet to be brought into its communication area.

The measures according to the invention furthermore advantageously achieve the result that already inventorized data carriers that are to be kept out of the actual inventorizing operation can nevertheless again communicate with the communication station, for example by transmitting a separate wake-up command that can be generated by the communication station in order to be able to include undesirably or erroneously or owing to interference signals data carriers classified as already inventorized data carriers in an inventorizing operation again or by generating a "power on" reset signal, which is possible as a result of briefly switching off the RF signal that can be generated by a communication station and can be delivered to all the data carriers present in the communication area of the communication station.

In the solutions according to the invention, it is very advantageous if the identification signal is generated as a response signal, in which case the response-signal generation means is then formed by the identification signal generation means. This is particularly advantageous in regard to a design that is as simple as possible in terms of circuitry.

In the solutions according to the invention, the transmission parameters that are utilized in the course of the inventorization of data carriers to be performed to transmit the identification signals may be formed, for example, by time slots and the transmission parameters used for transmitting response signals after an inventorization already performed may be formed, for example, by different types of modulation or different types of coding. The transmission parameters used for the purpose of transmitting identification signals for the purpose of an inventorization to be carried out may also be formed by different types of modulation and by different types of coding. It has proved particularly advantageous in the case of solutions according to the invention if the communication station delivers an inventorization command with the aid of which a time reference is produced between time slots used as transmission parameters and if, as a consequence of the processed acknowledgement command, every data carrier that has received and processed an acknowledgement command delivers its response signal in a certain time-slot range to the communication station during a subsequent inventorizing procedure, in which connection it has proved particularly advantageous if said delivery takes place in a single time slot. Such an solution has proved advantageous in regard to a particularly simple implementable circuitry design and in regard to a good communication between already inventorized data carriers, on the one hand, and a communication station on the other hand.

These and other aspects of the invention are apparent from and will be elucidated with reference to the exemplary embodiment described hereinafter, but to which the invention is not restricted

DETAILED DESCRIPTION

Figure 1:
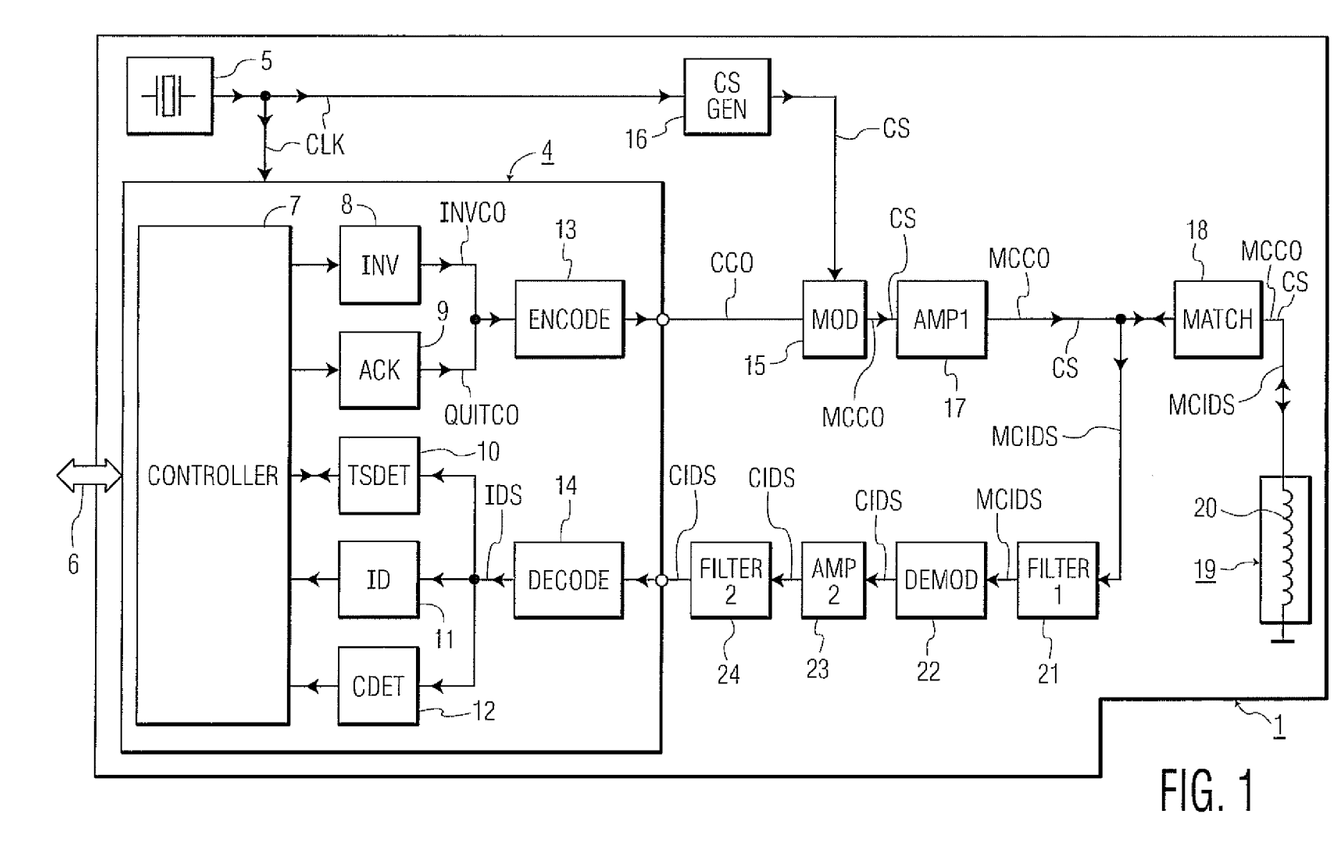
FIG. 1 shows schematically in the form of a block circuit diagram a part, essential in the present context, of a communication station in accordance with the invention.
Figure 2:
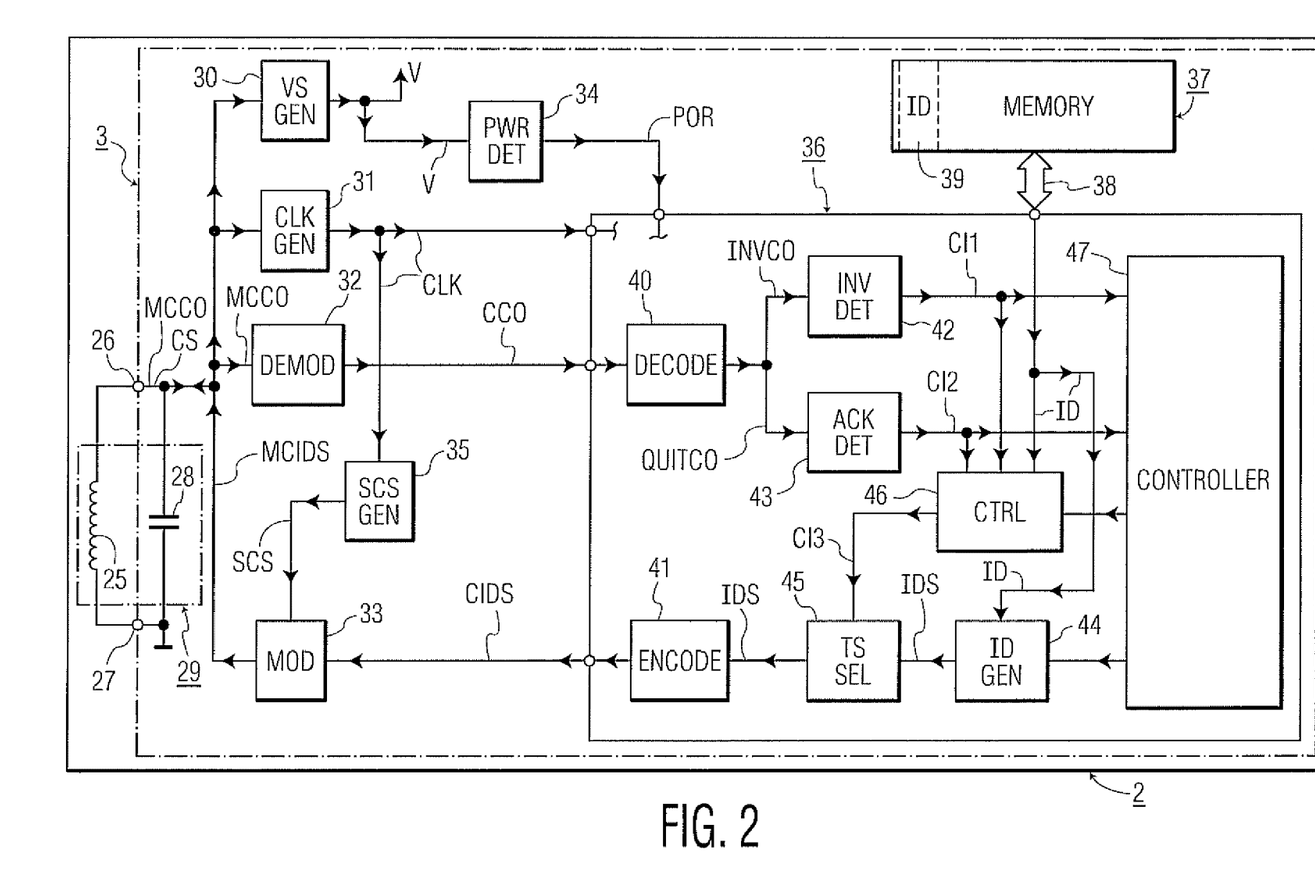
FIG. 2 shows schematically in the form of a block circuit diagram a part, essential in the present context, of a data carrier in accordance with the invention that contains an integrated circuit in accordance with the invention.

FIG. 1 shows a communication station 1 and FIG. 2 a data carrier 2. The data carrier 2 contains an integrated circuit 3. The communication station 1 and the data carrier 2 are designed for contact-free communication with one another. In standard application cases, a multiplicity of data carriers 2 are in communication connection with the communication station 1, the data carriers 2 being situated in a communication area of the communication station 1. Before data contained in each of the data carriers 2 can be read out or data can be written into each of the data carriers 2, a so-called inventorization of the plurality of data carriers 2 has to be performed with the aid of the communication station 1 communicating with the data carriers 2 in a contact-free way. In the course of such an inventorization, for each data carrier 2, identification data ID significant for the respective data carrier 2 are transmitted by the respective data carrier 2 to the communication station 1 and are stored in the communication station 1, with the result that, in the communication station 1, the identification data ID are known for all the data carriers 2 having communication connection to the communication station 1, as a result of which it is possible for the communication station 1 to be able to enter into communication connection in a controlled manner without error using the identification data ID significant for a data carrier 2 in order, for example, to read useful data out of the respective data carrier 2 or to store useful data in the respective data carrier 2.

The communication station 1 comprises a microcomputer 4. Instead of the microcomputer 4, a fixed-wire logic circuit may also be provided. Furthermore, the communication station 1 comprises a quartz oscillator 5 by means of which a clock signal CLK can be generated, which clock signal CLK is fed to the microcomputer 4. The microcomputer 4 is connected via a BUS connection 6 to a HOST computer not shown in FIG. 1 in order to be able to perform a data exchange between the HOST computer and the microcomputer 4. By means of the microcomputer 4, a multiplicity of means and functions are implemented, of which only means and functions are, however, dealt with in greater detail here that are essential in the present context.

The microcomputer 4 comprises procedure control means 7 by means of which the procedures that can be performed in the microcomputer 4 can be controlled. The microcomputer 4 furthermore comprises inventorization-command generating means 8 and acknowledgement-command-generating means 9 and time-slot detecting means 10 and identification-signal detecting means 11 and collision-detecting means 12 and coding means 13 and decoding means 14. The microcomputer 4 also comprises a number of further command-generating means and signal-generating means and command-detecting means and signal-detecting means, which are not, however, dealt with in greater detail here.

The inventorization-command generating means 8 serve to generate an inventorization command INVCO. The acknowledgement-command-generating means 9 serve to generate an acknowledgement command QUITCO. The time-slot detecting means 10 serve to detect the respective time slot in which at least one identification signal IDS and, consequently, the identification data ID contained therein are transmitted to the communication station 1 during an inventorizing procedure. The identification-signal-generating means 11 serve to detect an identification signal IDS and the identification data ID contained therein. The collision-detecting means 12 serve to detect a collision between at least two identification signals IDS transmitted essentially simultaneously in one time slot. The coding means 13 serve to code the commands or signals fed to them and, consequently, also to code the inventorization command INVCO and the acknowledgement command QUITCO. The coding means 13 deliver coded commands CCO after performing coding of the commands fed to them. The decoding means 14 serve to decode coded identification signals CIDS fed to them. The decoding means 14 deliver the decoded identification signals IDS after performing a decoding.

The communication station 1 furthermore contains modulation means 15 to which the coded commands CCO can be fed that are generated with the aid of the coding means 14 and to which a carrier signal CS can also be fed. To generate the carrier signal CS, the communication station 1 comprises a carrier-signal generator 16 to which the clock signal CLK can be fed from the quartz oscillator 5 and which generates the carrier signal CS using the clock signal CLK. By means of the modulation means 15, the carrier signal CS can be modulated using the coded commands CCO fed, the modulation means 15 delivering modulated coded commands MCCO after performing a modulation. The modulated coded commands MCCO can be fed to first amplifier means 17 which cater for amplification of the modulated coded commands MCCO. The modulation mentioned of the unmodulated carrier signal CS takes place using the coded commands CCO in the case of the desired transmission of commands by the communication station 1 to the data carriers 2. In the case of a desired transmission of signals by the data carriers 2 to the communication station 1, the unmodulated carrier signal CS generated with the aid of the carrier-signal generator 16 is passed in an unmodulated way by the modulation means 15 to the first amplifier means 17. Both the modulated coded commands MCCO and the unmodulated carrier signal CS can be fed by the amplifier means 17 to matching means 18, which matching means 18 pass the modulated coded commands MCCO fed to them or the carrier signal CS to the station transmission means 19, which, in this present case, contain a transmission coil 20. The transmission coil 20 is provided for inductive coupling, that is to say transformer coupling, with the transmission coils of the data carriers 2. Instead of the transmission coil 20, the station transmission means 19 may also comprise a transmission dipole. Instead of the station transmission means 19 comprising a transmission coil 20 or a dipole, station transmission means may also be provided that are active in a capacitive way or an optical way.

The station transmission means 19 serve not only to transmit commands and signals by the communication station 1 to the data carriers 2 present in the communication area of the communication station 1, but also to receive signals that are to be transmitted by the respective data carriers 2 to the communication station 1. For example, identification signals IDS are to be transmitted by the data carriers 2 to the communication station 1. Said identification signals IDS are transmitted in such a way that the identification signals IDS are coded and modulated, with the result that modulated coded identification signals MCIDS are received with the aid of the station transmission means 19. The received modulated identification signals MCIDS are fed by the station transmission means 19 via the matching means 18 to the first filter means 21, which cater for filtering out interference components and delivering interference-freed modulated coded identification signals MCIDS to demodulation means 22. The demodulation means 22 are designed to demodulate the modulated coded identification signals MCIDS fed to them. After demodulation of the coded identification signals IDS, the demodulation means 22 deliver coded identification signals CIDS to second amplifier means 23, which cater for amplification of the coded identification signals CIDS fed to them. Connected downstream of the second amplifier means 23 are second filter means 24, which cater for further filtering and which deliver the coded identification signals CIDS to the decoding means 14 after filtering.

As already mentioned, the communication station 1 is provided and designed for contact-free communication with a multiplicity of data carriers 2. The data carriers 2 have the same design that is described below by reference to the data carrier 2 shown in FIG. 2.

In addition to the integrated circuit 3, the data carrier 2 comprises a transmission coil 25 that is connected to a first terminal 26 and a second terminal 27 of the integrated circuit 3. By means of the transmission coil 25, the data carrier 2 can communicate in a contact-free way with the communication station 1 via the transmission coil 20 of the communication station 1. Connected in parallel with the transmission coil 25 is a capacitor 28 contained in the integrated circuit 3. The transmission coil 25 and the capacitor 28 form an oscillatory circuit that is tuned to a working frequency and that is a component of data-carrier transmission means 29. Instead of the transmission coil 25, the data-carrier transmission means 29 may also comprise a transmission dipole. Instead of the data-carrier transmission means 29 comprising a transmission coil 25 or a dipole, data-carrier transmission means may also be provided that are operative in a capacitive way or optical way.

The integrated circuit 3 of the data carrier 2 and, consequently, the data carrier 2 comprise supply-voltage generating means 30 and clock-signal regenerating means 31 and demodulation means 32 and modulation means 33. Said four means 30, 31, 32 and 33 are each connected to the data-carrier transmission means 29.

The supply-voltage generation means 30 serve to generate a supply voltage V utilizing the signals delivered by the data-carrier transmission means 29, that is to say, for example, using modulated coded commands MCCO or using the unmodulated carrier signal CS. The supply voltage V that can be generated with the aid of the supply-voltage generating means 30 can be fed to all those components of the integrated circuit 3 that require the supply voltage V, which is not, however, shown separately in FIG. 2. Connected to the supply-voltage generating means 30 are "power-on" detecting means 34, to which the output signal of the supply-voltage generating means 30, that is to say the respective generated supply voltage V, can be fed. By means of the "power-on" detecting means 34, it is possible to detect whether a sufficiently high supply voltage V is available. If such a sufficiently high supply voltage V is available, the "power-on" detecting means 34 deliver a so-called "power-on" reset signal POR.

The clock-signal regenerating means 31 serve to regenerate a clock signal CLK using the signals delivered by the data-carrier transmission means 29, that is to say using, for example, the modulated coded commands MCCO or using the unmodulated carrier signal CS. The clock-signal regenerating means 31 deliver the clock signal CLK. Instead of the clock-signal regenerating means 31, an internal oscillator can be provided that is independent of the signals delivered by the data-carrier transmission means 29 and by means of which a clock signal CLK can be generated. Such an internal oscillator is advantageous, in particular, if the communication between a communication station and a data carrier takes place at a very high working frequency, for example at working frequencies in the so-called UHF range or in the microwave range.

The demodulation means 32 serve to decode commands and signals fed to them, that is to say, for example, to demodulate the modulated coded commands MCCO. After performing demodulation of modulated coded commands MCCO, the demodulation means 32 deliver coded commands CCO.

The modulation means 33 serve to modulate signals, for example to modulate coded identification signals CIDS that can be fed to the modulation means 33. A subcarrier signal SCS can furthermore also be fed to the modulation means 33. To generate the subcarrier signal SCS, a subcarrier-signal generator 35 is provided to which the clock signal CLK can be fed from the clock-signal regenerating means 31 and that generates the subcarrier signal SCS using the clock signal CLK. In the case of the performance of modulation, the subcarrier signal SCS is modulated as a function of, for example, the coded identification signals CIDS by means of the modulation means 33, with the result that the modulation means 33 deliver, as a consequence thereof, modulated coded identification signals MCIDS that are subsequently transmitted to the communication station 1 by means of the data-carrier transmission means 29 and, in this connection, with the aid of the transmission coil 25 in particular.

The integrated circuit 3 of the data carrier 2 and, consequently, the data carrier 2 comprise a microcomputer 36. Instead of the microcomputer 36, a fixed-wire logic circuit may also be provided. By means of the microcomputer 36, a number of means and functions are implemented, of which only means and functions essential in this present context are, however, dealt with below in greater detail. The "power-on" reset signal POR and the clock signal CLK can be fed to the microcomputer 36 for purposes long known to persons skilled in the art.

The integrated circuit 3 furthermore contains memory means 37 that are connected via a connection 38 to the microcomputer 36. The memory means 37 contain a multiplicity of memory areas of which only one memory area 39 is indicated by means of chain-dot lines. Stored in the memory area 39 are identification data ID that are significant for the data carrier 2 and unambiguous. A number of further data are stored in the memory means 37, but this is not dealt with in greater detail.

Decoding means 40 and coding means 41 are implemented by means of the microcomputer 36. The decoding means 40 are provided for decoding commands and signals fed to them, that is to say also for decoding coded commands CCO. After decoding coded commands CCO, the decoding means 40 deliver decoded commands, for example the inventorization command INVCO or the acknowledgement command QUITCO. The coding means 41 serve to code signals, for example to code identification signals IDS. After coding the identification signal IDS, the coding means 41 deliver a coded identification signal CIDS.

Furthermore, inventorization-command detecting means 42 and acknowledgement-command detecting means 43 and identification-signal-generating means 44 and time-slot selection means 45 and control means 46 are implemented by means of the microcomputer 36. The function of the means 43, 44, 45 and 46 is dealt with below in still greater detail. Furthermore, the microcomputer 36 comprises procedure-control means 47 by means of which the procedures can be controlled that are performed in the microcomputer 36.

The inventorization-command detecting means 42 are provided and designed to detect the inventorization command INVCO fed to them. If the inventorization-command detecting means 42 detect an inventorization command INVCO, the inventorization-command detecting means 42 deliver a first control information item CI1.

The acknowledgement-command detecting means 43 are provided and designed to detect the acknowledgement command QUITCO that can be fed to them. If the acknowledgement-command detecting means 43 detect an acknowledgement command QUITCO, the acknowledgement-command detecting means deliver a second control information item CI2.

The identification-signal-generating means 44 serve to generate an identification signal IDS. In order to be able to generate said identification signal IDS, the identification data ID read out of the memory area 39 of the memory means 37 are fed to the identification-signal-generating means 44. The identification signal IDS is generated by means of the identification data ID and additional data, such as security data. Let it already be recorded at this point that the identification-signal-generating means 44 simultaneously also form response-signal-generating means by means of which a response signal can be generated that is generated, in the present case, likewise by means of the identification data ID and is formed by the identification signal IDS, but which does not necessarily have to be the case since the response signal, the purpose of which will be dealt with in still greater detail below, may also be different from the identification signal IDS. The identification signal IDS generated by means of the identification-signal-generating means 44 has to be transmitted by the data carrier 2 to the communication station 1 for inventorizing purposes.

In this present case, the design of the communication station 1 and of the data carriers 2 is such that, during the inventorization of data carriers 2, inventorizing procedures MP1, MP2, MP3, MP4 and so on are performed consecutively, a set TS(1), TS(2), TS(3), TS(N−2), TS(N−1), TS(N), TS(N+1), TS(K−2), TS(K−1) and TS(K) of time slots TS being defined in the course of every inventorizing procedure, which is also dealt with in greater detail below by reference to FIG. 3. By means of the time-slot selection means 45, it is possible to define the time slots TS(1) to TS(N) in which the identification signal IDS is passed by the identification-signal-generating means 44 to the coding means 41 and is subsequently fed to the modulation means 33 and is therefore transmitted by the data carrier 2 to the communication station 1. By means of the time-slot selection means 45, a time slot TS can consequently be selected from a plurality of time slots, it being possible to transmit the identification signal IDS generated to the communication station 1 using the selected time slot. Such a time slot TS is to be regarded as a so-called transmission parameter, so that the time-slot selection means 45 are to be regarded as transmission-parameter selection means with the aid of which a transmission parameter can be selected from a multiplicity of transmission parameters, it being possible to transmit the identification signal IDS generated to the communication station 1 using the selected parameter.

To control the time-slot selection means 45, the control means 46 are provided. The control means 46 interact, on the input side, with the inventorization-command detecting means 42 and with the acknowledgement-command detecting means 43 and with the memory means 37 and, on the output side, with the time-slot selection means 45, and specifically in such a way that there can be fed to the control means 46 the first control information item CI1 from the inventorization-command detecting means 42 and the second control information item CI2 from the acknowledgement-command detecting means 43 and that there can be fed by the control means 46 to the time-slot selection means 45 a third control information item CI3 by means of which the time slot TS selected can be brought into effect in a data carrier 2. The control means 46 interact, as already mentioned, on the input side with the memory means 37, and specifically, in such a way that the identification data ID can be fed from the memory area 39 of the memory means 37 to the control means 46.

The control means 46 are designed in such a way that, as a consequence of detecting an inventorization command INVCO by means of the inventorization-command detecting means 42 and, consequently, also as a consequence of receiving the first control information item CI1 delivered by the inventorization-command detecting means 42, ensure that they generate and deliver such a third control information item CI3 that the time-slot selection means 45 select a time slot TS from a first subset TS(1) to TS(N) of time slots TS. In this process, the control means 46 use the identification data ID likewise fed to them in this process, a portion of the identification data ID being used for this purpose in the control means 46 to calculate, by means of an algorithm executed in the control means 46, such a third control information item CI3 by means of which a time slot TS dependent on the portion of the identification data ID taken into account is selected. A time slot TS may, however, also be selected by means of a random generator, which has long been known to persons skilled in the art.

The control means 46 are furthermore designed in such a way that, as a consequence of detecting an acknowledgement command QUITCO by means of the acknowledgement-command detecting means 43 and, therefore, as a consequence of receiving the second control information item CI2 delivered in this case by the acknowledgement-command detecting means 43, the control means 46 cater for the determination of such a third control information item CI3 with which a certain predetermined time slot TS is selected, which certain predetermined time slot originates from a second subset TS(N+1) to TS(K) of time slots TS.

In this connection, it should also be recorded that, by means of the detected inventorization command INVCO and, consequently, with the aid of the first control information item CI1 generated as a consequence of detecting the inventorization command INVCO, a time reference can be produced between the time slots TS, and specifically, between the time slots occurring and elapsing in the communication station 1 and the time slots occurring and elapsing in the data carriers 2. The existence of such a time reference between the time slots TS mentioned in the communication station 1 and in the data carriers 2 is important for a satisfactory mode of operation and, consequently, for a satisfactory inventorization of the data carriers 2 by means of the communication station 1.

In the present case, the design is such that, as a consequence of detecting an acknowledgement command QUITCO and as a consequence of the occurrence, effected thereby, of the second control information item CI2 and of the third control information item CI3 generated by means of the control means 46, there can be selected by the time-slot selection means 45 a time-slot range that is formed by the second subset TS(N+1) to TS(K) of time slots TS. It may be pointed out at this point, however, that, in the case of an alternative data carrier 2 not shown, a design can also be provided in which the time-slot selection means 45 are designed to select only a single certain predetermined time slot TS as a consequence of detecting an acknowledgement command QUITCO.

An entire inventorizing procedure for a plurality of data carriers 2 by means of the communication station 1 is described below by reference to FIG. 3. FIG. 3 shows underneath one another three consecutively occurring inventorizing procedures, namely the inventorizing procedures MP1, MP2 and MP3. A subsequent inventorizing procedure MP4 is indicated in FIG. 3 only in a more schematic way.

Let it be assumed that, at the beginning of the method of inventorizing the data carriers 2, a total of eight (8) data carriers 2 are situated in the communication area of the communication station 1. Said data carriers 2 are characterized by means of the A, B, C, D, E, F, G and H. At the beginning of the method of inventorizing the data carriers 2 and, consequently, at the beginning of the first inventorizing procedure MP1, but also at the beginning of every further inventorizing procedure MP2, MP3, MP4 and so on, the inventorization command INVCO is generated in each case in accordance with a specified transmission protocol by the communication station 1 and transmitted to all the data carriers 2. In accordance with said transmission protocol, a waiting time TW is defined at the end of the inventorization command INVCO. After the waiting time TW has elapsed, there begins, both in the communication station 1 and in all the data carriers 2, the first time slot TS(1) of a set of time slots TS, which set or sequence of time slots TS comprise the time slots TS(1), TS(2), TS(3), TS(N−2), TS(N−1), TS(N), TS(N+1), TS(K−2), TS(K−1) and TS(K). Said set TS(1) to TS(K) of time slots occurs during each of the consecutive inventorizing procedures MP1, MP2, MP3 and so on. In regard to the time slots TS, it should again be pointed out that the subset TS(1) to TS(K) of time slots TS comprises two subsequences, namely the first subsequence TS(1) to TS(N) and the second subsequence TS(N+1) to TS(K). The first subsequence TS(1) to TS(N) of time slots is provided so that, in said first subsequence TS(1) to TS(N) still uninventorized data carriers 2 each answer to the communication station 1, so that, therefore, in the first subsequence TS(1) to TS(N), all still uninventorized data carriers 2 transmit their identification signal IDS and, consequently, their identification data ID to the communication station 1. The second subsequence of time slots TS (N+1) to TS(K) is provided so that, in the second subsequence TS(N+1) to TS(K), those data carriers 2 each respond to the communication station 1 that have already been inventorized and the identification data ID of which are consequently already known in the communication station 1. In this present case, all the time slots TS(1) to TS(K) have the same length, that is to say the same time duration, but this does not necessarily have to be so because time slots TS having different time spans are also possible, for example time slots TS the time spans of which are dependent on the length of the data blocks transmitted therein.

Transmitting the inventorization command INVCO to all the data carriers 2 achieves the result that the inventorization command INVCO is detected by means of the inventorization-command detecting means 42 in every data carrier 2, which has the consequence that the inventorization-command detecting means 42 deliver the first control information item CI1 in every data carrier 2 and feed it to the control means 46. This has the consequence that, by means of the control means 46 and by means of the identification data ID, a third control information item CI3 is generated as a function of a portion of the identification data ID, as a result of which an appropriate selection of a time slot TS occurs by means of the time-slot selection means 45 from the first subset TS(1) to TS(N) of time slots. As a consequence of said selection of time slots TS by means of the time-slot selection means 45 of every data carrier 2, the state of affairs described below is achieved in the example assumed in accordance with FIG. 3.

Figure 3:
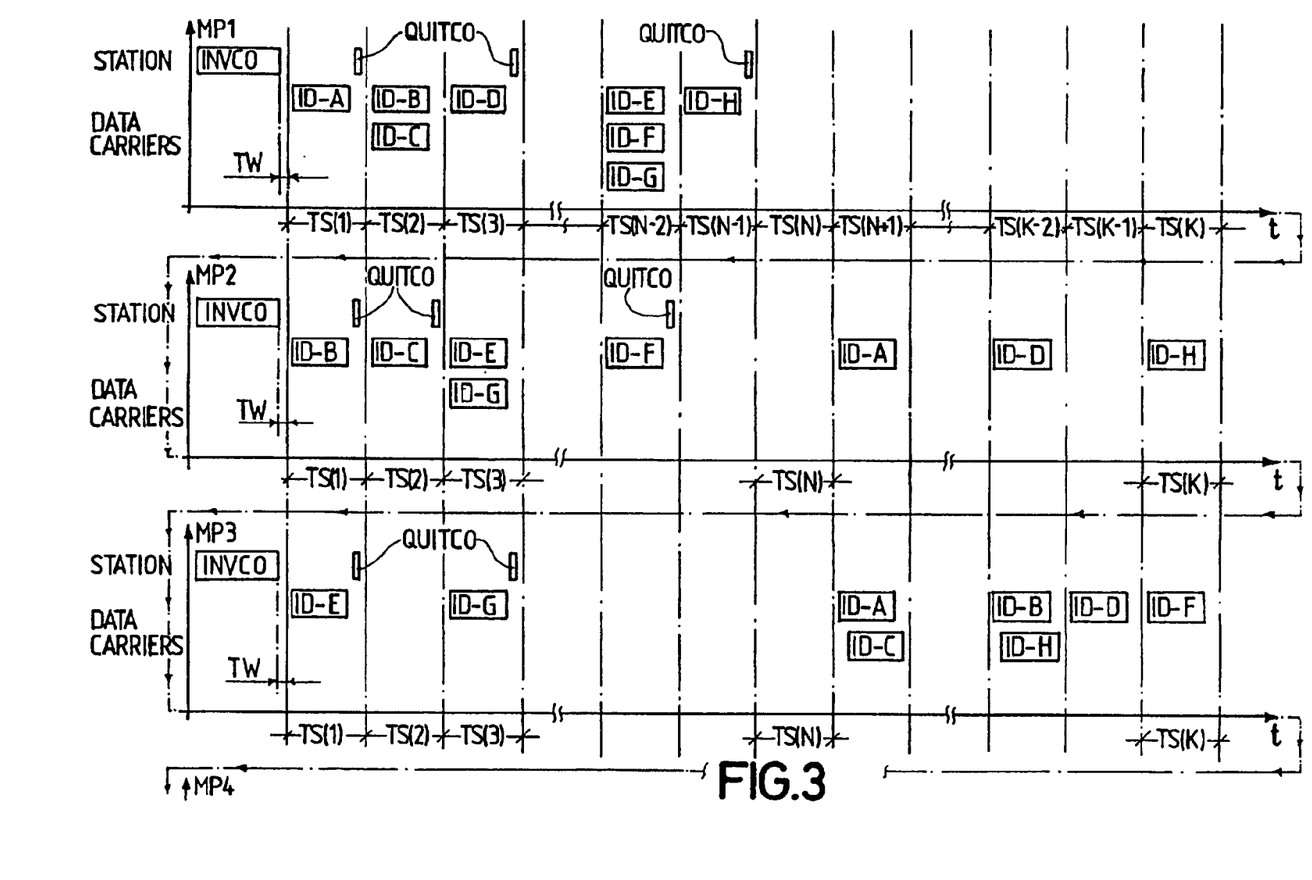
FIG. 3 shows schematically in a time diagram the commands and signals occurring in the course of three consecutive inventorizing procedures.

In the example assumed in accordance with FIG. 3, the identification data ID-A of the data carrier 2 characterized by the capital letter A is transmitted to the communication station 1 in the first time slot TS(1). Since only said identification data ID-A are transmitted to the communication station 1 by the respective data carrier 2 in the first time slot TS(1), this has the consequence that the identification data ID-A are detected by means of the identification-signal detecting means 11 in an unambiguous way and are subsequently stored in the communication station 1 in a way not explained in greater detail, with the result that said data carrier 2 is inventorized. After the transmission of the identification data ID-A by the respective data carrier 2 to the communication station 1 and the detection of the identification data ID-A, the communication station 1 generates the acknowledgement command QUITCO towards the end of the first time slot TS(1) and transmits the same to the data carrier 2 characterized by the capital letter A, which has the consequence that the acknowledgement command QUITCO is detected by means of the acknowledgement-command detecting means 43 in the respective data carrier 2 and, consequently, the second control information item CI2 is generated.

In the subsequent, second time slot TS(2), the identification data ID-B and ID-C are transmitted by the respective data carriers 2 to the communication station 1. Since, in this case, the identification data ID-B and ID-C are transmitted simultaneously by two data carriers 2 to the communication station 1 in one time slot, this results in a collision, which is detected by means of the collision-detecting means 12. This has, in turn, the consequence that no acknowledgement command QUITCO is generated in the communication station 1.

In the subsequent, third time slot TS(3), the identification data ID-D are transmitted only by the data carrier 2 characterized by the capital letter D to the communication station 1, which has the consequence that the identification data ID-D are detected by means of the identification-signal detecting means 11 and are then stored in the communication station 1, with the result that said data carrier 2 is inventorized. Subsequently, the acknowledgement signal QUITCO is generated in the communication station 1 by means of the acknowledgement-command-generating means 9 and is transmitted by the communication station 1 to the data carrier 2 characterized by the capital letter D.

Subsequently, according to the assumed example, the identification data ID-E and ID-F and ID-G of the three respective data carriers 2 are transmitted in the time slot TS(N−2) by said data carriers 2 to the communication station 1, which again results in a collision, which is detected by means of the collision-detecting means 12, with the result that the generation of an acknowledgement information item QUITCO is prevented.

Finally, the identification data ID-H of the data carrier 2 characterized by the capital letter H is transmitted to the communication station 1 in the time slot TS(N−1) which is detected with the aid of the identification-signal detecting means 11, which has the consequence that said data carrier 2 is inventorized and that the acknowledgement command QUITCO is generated with the aid of the acknowledgement-command-generating means 9 and is transmitted by the communication station 1 to the data carrier 2 characterized by the capital letter H.

During the last time slot TS(N) of the first subset TS(1) to TS(N) of time slots TS, no further identification data appear. Likewise, in the time slots of the second subset TS(N+1) to TS(K) of time slots TS, no identification data appear during the first inventorizing procedure MP1.

After the first inventorizing procedure MP1, the second inventorizing procedure MP2 is automatically started in accordance with the transmission protocol, the inventorization command INVCO being transmitted by the communication station 1 to the data carriers 2 after a certain time at the beginning of the second inventorizing procedure MP2. It would, however, be quite possible not to generate an inventorization command INVCO with the communication station 1 at the beginning of the second inventorizing procedure MP2 and at the beginning of all the further inventorizing procedures MP3, MP4 and so on necessary and to transmit them to the data carriers 2.

In the second inventorizing procedure MP2, the identification data ID-B of the respective data carrier 2 is transmitted to the communication station 1 in the first time slot TS(1) which has as a consequence the inventorizing of said data carrier 2 and, furthermore, the transmission of the acknowledgement command QUITCO towards the end of the first time slot TS(1) to the data carrier 2 characterized by the capital letter B by the communication station 1. In the subsequent, second time slot TS(2), the identification data ID-C are transmitted by the respective data carrier 2 to the communication station 1, after which the acknowledgement command QUITCO is transmitted to the respective data carrier. In the third time slot TS(3), the identification data ID-E and ID-G are transmitted by the respective data carriers 2 to the communication station 1, with the result that a collision occurs and is detected by means of the collision-detecting means 12, which has the prevention of the generation of an acknowledgement signal QUITCO as a consequence. In the time slot TS(N−2), the identification data ID-F are transmitted by the respective data carrier 2 to the communication station 1, which has the consequence that the acknowledgement command QUITCO is transmitted to the respective data carrier 2 in the time slot TS(N−2).

In a particularly advantageous way, the identification data ID-A and ID-D and ID-H of those three (3) data carriers 2 are now transmitted during the second subsequence TS(N+1) to TS(K) of time slots TS after a certain time to the communication station 1 that have already been inventorized in the communication station 1 during the previous inventorizing procedure MP 1 with the aid of their identification data ID-A and ID-D and ID-H. In this process, by means of the control means 46, to which the second control information item CI2 was fed from the acknowledgement-command detecting means 43, a third control information item CI3 is generated in each of the respective data carriers 2 which control information item has the consequence that, with the aid of the time-slot selection means 45 contained in the respective data carrier 2, provision is made that the data carrier 2 characterized by the capital letter A transmits, to the communication station 1, its identification data ID-A in the time slot TS(N+1) and the data carrier 2 characterized by the capital letter D transmits its identification data ID-D in the time slot TS(K−2) and the data carrier 2 characterized by the capital letter H transmits its identification data ID-H in the time slot TS(K). In this way, the advantage is attained that, in the course of every inventorizing procedure, not only the still uninventorized data carriers 2 transmit their identification data ID to the communication station 1, but also the previously already inventorized data carriers 2 also additionally transmit their identification data ID to the communication station 1 with the result that, during every inventorizing procedure the identification data ID are advantageously always transmitted by all the data carriers 2 to the communication station 1, which can be used, for example, to determine in a simple way whether all the data carriers 2 are still situated in the communication area of the communication station 1.

In the subsequent inventorizing procedure MP3, during the first subsequence TS(1) to TS(N) of time slots TS, the identification data ID-E and ID-G are transmitted in different time slots, namely in the time slots TS(1) and TS(3) to the communication station 1 by the respective data carriers 2, which is detected by means of the identification detecting means 11 with the result that the data carriers 2 characterized by the capital letters E and G are then also inventorized in the communication station 1, which is signaled by the generation and delivery of the acknowledgement signal QUITCO in each case in the first time slot TS(1) and in the third time slot TS(3) to the respective data carrier 2. During the second subsequence TS(N+1) to TS(K) of time slots TS, in the third inventorizing procedure MP3, the identification data ID-A, ID-C, ID-B, ID-H, ID-D and ID-F are transmitted to the communication station 1 by the respective data carriers 2 in the time slots TS(N+1), TS(K−2), TS(K−1) and TS(K).

According to the method in accordance with the exemplary embodiment described above, in the event of a collision between at least two information data in one time slot, no acknowledgement command QUITCO is generated in said time slot. As a result, there occurs in every such time slot a time loss that can be prevented in that, if a collision occurs, the communication station 1 generates in a time slot a short transfer command which transfer command has an immediate transfer to the next time slot as a consequence. Such a transfer command is generated especially if no identification data at all are transmitted to the communication station 1 in a time slot because the gain in time as a consequence of generating a transfer command is then particularly high.

It should also be mentioned that both the acknowledgement command QUITCO as well as any transfer commands generated each have a bit structure that does not occur in other bit sequences that originate either from a reader or from data carriers.

In the method in accordance with the exemplary embodiment described above, an acknowledgement command QUITCO is generated in every respective time slot after the satisfactory detection of identification data ID in the communication station 1 and transmitted to the respective data carrier 2. Such an acknowledgement command QUITCO for a certain data carrier 2 may comprise a simple bit combination or even only a single bit. It has proved very advantageous, however, if a portion of the identification data ID of the data carrier 2 to be acknowledged is contained in the acknowledgement command QUITCO. This ensures that only the data carrier 2 to be acknowledged is always actually acknowledged, which prevents the far removed data carrier 2 from being acknowledged in an undesirable way in the case of two data carriers responding in a time slot, of which one is, however, so far removed from the communication station 1 that its identification data ID do not reach the communication station 1. It should also furthermore be mentioned that it is not absolutely necessary to transmit the acknowledgement commands QUITCO in every time slot TS, but that this may also take place at the end of every inventorizing procedure MP1 and MP2 and MP3, respectively.

In the method according to the exemplary embodiment described above, the various transmission parameters, with the utilization of which the identification data ID can be transmitted by the data carrier 2 to the communication station 1, are formed by time slots TS. Accordingly, the control means 46 are provided for controlling the time-slot selection means 45. Other solutions are also possible in which the transmission parameters are formed by different coding options or by different modulation conditions. In these cases, the control means 46 are designed accordingly and are provided for controlling the coding means 41 or for controlling, for example, the subcarrier signal generator 35, respectively. In the first case mentioned, different coding options are activated in the coding means 41 by means of the control means 46, the coding means 41 having, of course, a design suitable for this purpose. In the second case mentioned, the control means 46 have the effect that mutually different subcarrier signals SCS are generated by means of the subcarrier-signal generator 35 in regard to subcarrier frequency and different modulation conditions are achieved in this way.

The acknowledgement command QUITCO for a certain data carrier 2, which acknowledgement command QUITCO contains a portion of the identification data ID of the respective data carrier 2, also contains an information item in regard to the transmission parameter, that is to say in accordance with the exemplary embodiment described above, in regard to the time slot with the utilization of which the identification data ID of the already inventorized data carrier 2 is to be transmitted during a subsequent inventorizing procedure to the communication station 1 by the respective data carrier 2.

It should again be expressly pointed out that, during the second subset TS(N+1) to TS(K) of time slots TS, the identification data ID, that is to say the identification signal IDS does not necessarily have to be transmitted as a response signal to the communication station 1 by a data carrier 2, but a response signal different from the identification signal IDS formed by means of the identification data ID can also be transmitted to the communication station 1. Important in the present context is that the signals transmitted during the first subset TS(1) to TS(N) are identification signals for the purpose of the inventorization to be performed and the signals transmitted during the second subset TS(N+1) to TS(K) are response signals for the purpose of confirming the presence of already inventorized data carriers 2.

It should furthermore be mentioned that, in the case where the response signals for the purpose of confirming the presence of already inventorized data carriers 2 are different from identification signals for the purpose of inventorizing data carriers, said response signals may be very short and may comprise only a few bits and can be transmitted in only a single time slot to the communication station 1, in which case it is then particularly advantageous to allow said single time slot for transmitting the response signals of already inventorized data carriers 2 to coincide in terms of time with the waiting time TW. This achieves a particularly advantageous solution in regard to as short an inventorizing time duration as possible.

In the method in accordance with the exemplary embodiment described above, it is assumed that all the identification data ID-A, ID-B, ID-C, ID-D, ID-E, ID-F, ID-G and ID-H are different from one another. It should be recorded, however, that the method described can also be applied if, for example, some of the identification data are identical, for example the identification data ID-A and ID-D and ID-H because, owing to the fact that said identification data are each transmitted in only a single time slot TS to the communication station 1 by the respective data carrier 2, said identification data are detected in the communication station 1 in an unambiguous and satisfactory way and, consequently, the respective data carriers are inventorized in a satisfactory way.

In the method in accordance with the exemplary embodiment described above, in which the response signals that are transmitted during the second subset TS(N+1) to TS(K) of time slots TS to the communication station 1, are formed by the identification signals IDS, the response signals transmitted to the communication station 1 can be checked as to whether these response signals corresponding to the identification signals IDS were already detected during a previously performed inventorizing procedure and, consequently, the respective data carriers 2 have been inventorized. If it is found during said checking operation that a data carrier 2 transmits to the communication station 1, during the second subset TS(N+1) to TS(K), a response signal corresponding to an identification signal IDS but not yet known and stored in the communication station 1, the communication station 1 detects that the respective data carrier 2 has not yet been inventorized, after which the communication station 1 has the option, in the course of a subsequently performed additional procedure, of also inventorizing the respective data carrier 2.

In the method in accordance with the exemplary embodiment described above, it is assumed that, during the performance of the method of inventorizing the data carriers 2, a predetermined number of eight (8) data carriers 2 are situated in the communication area of the communication station 1. It is, however, expressly pointed out that, during the performance of such a method, additional data carriers 2 may also enter the communication area of the communication station 1.

The invention claimed is:

1. A method of consecutively inventorizing a plurality of data carriers, wherein a communication station interacts in a contact-free way with the plurality of data carriers, the method comprising:
   generating identification signals with the plurality of data carriers that are present in a communication area of the communication station;
   delivering the generated identification signals using transmission parameters, selectable from a plurality of transmission parameters, to the communication station;
   receiving the delivered identification signals with the communication station;
   generating and delivering, with the communication station, after an unambiguous reception of an identification signal of a particular data carrier in an initial inventorizing procedure, an acknowledgement command, wherein a detection of a collision prevents generation of any acknowledgement command;
   receiving and processing, with the particular data carrier, the generated and delivered acknowledgement command; and
   delivering, in response to the received and processed acknowledgement command, during a subsequent inventorizing procedure, a response signal using a predetermined transmission parameter to the communication station, wherein the predetermined transmission parameter is different from the plurality of transmission parameters from which transmission parameters can be selected to transmit the identification signals to the communication station.

2. The method of claim 1, further comprising:
delivering an inventorization command by means of which a time reference is produced between time slots used as the transmission parameters; and
delivering, during the subsequent inventorizing procedure, with every particular data carrier that has received and processed the acknowledgement command, the response signal in a predetermined time-slot range to the communication station.

3. The method of claim 1, further comprising:
delivering, during the subsequent inventorizing procedure, with every particular data carrier that has received and processed the acknowledgement command, the response signal in a single time slot to the communication station.

4. The method of claim 1, wherein the plurality of transmission parameters are time slots that depend upon a selected portion of the identification signal.

5. The method of claim 1, wherein the plurality of transmission parameters are time slots that have durations depending on lengths of data blocks transmitted within the time slots.

6. The method of claim 1, wherein the plurality of transmission parameters are time slots and detection of a collision in a particular time slot results in an immediate transfer to a next time slot.

7. A data carrier that enables contact-free communication with a communication station and comprises an integrated circuit, wherein the integrated circuit comprises:
an identification signal generation means for generating an identification signal;
an acknowledgement-command detecting means for detecting an acknowledgement command generated by the communication station and transmitted to the data carrier, wherein a detection of a collision prevents generation of any acknowledgement command;
a transmission-parameter selection means, by means of which a transmission parameter can be selected from a plurality of transmission parameters, wherein the generated identification signal can be transmitted to the communication station using the selected transmission parameter;
a response signal generation means for generating a response signal; and
a control means that interacts with the response signal generation means and with the transmission-parameter selection means, by means of which, in response to a detection of the acknowledgement command by the acknowledgement-command detecting means, the transmission-parameter selection means selects a predetermined transmission parameter, wherein the predetermined transmission parameter is different from the plurality of transmission parameters from which the transmission parameter can be selected for transmitting the identification signal to the communication station, and the generated response signal can be transmitted to the communication station using the predetermined transmission parameter.

8. The data carrier of claim 7, wherein an inventorization-command detecting means is provided for detecting an inventorization command, by which means a time reference can be produced between time slots used as the transmission parameters, and wherein the transmission-parameter selection means selects a predetermined time-slot range as a consequence of detecting the acknowledgement command.

9. The data carrier of claim 7, wherein the transmission-parameter selection means selects a single time slot as a consequence of detecting the acknowledgement command.

10. The data carrier of claim 7, wherein the plurality of transmission parameters are time slots that depend upon a selected portion of the identification signal.

11. The data carrier of claim 7, wherein the plurality of transmission parameters are time slots that have durations depending on lengths of data blocks transmitted within the time slots.

12. The data carrier of claim 7, wherein the plurality of transmission parameters are time slots and detection of a collision in a particular time slot results in an immediate transfer to a next time slot.

13. An integrated circuit for a data carrier that enables contact-free communication with a communication station, wherein the integrated circuit comprises:
an identification signal generation means for generating an identification signal;
an acknowledgement-command detecting means for detecting an acknowledgement command generated by the communication station and transmitted to the data carrier, wherein a detection of a collision prevents generation of any acknowledgement command;
a transmission-parameter selection means, by means of which a transmission parameter can be selected from a plurality of transmission parameters, wherein the generated identification signal can be transmitted to the communication station using the selected transmission parameter;
a response-signal generating means for generating a response signal; and
a control means that interacts with the acknowledgement-command detecting means and with the transmission-parameter selection means and by means of which, in response to a detection of the acknowledgement command by the acknowledgement-command detecting means, the transmission-parameter selection means selects a predetermined transmission parameter, wherein the predetermined transmission parameter is different from the plurality of transmission parameters, from which the transmission parameter can be selected for transmitting the identification signal to the communication station, and the generated response signal can be transmitted to the communication station using the predetermined transmission parameter.

14. The integrated circuit of claim 13, wherein an inventorization-command detecting means is provided for detecting an inventorization command, by which means a time reference can be produced between time slots used as the transmission parameters, and wherein the transmission-parameter selection means selects a predetermined time-slot range in response to detecting the acknowledgement command.

15. The integrated circuit of claim 13, wherein the transmission-parameter selection means selects a single predetermined time slot in response to detecting the acknowledgement command.

16. The integrated circuit of claim 13, wherein the plurality of transmission parameters are time slots that depend upon a selected portion of the identification signal.

17. The integrated circuit of claim 13, wherein the plurality of transmission parameters are time slots that have durations depending on lengths of data blocks transmitted within the time slots.

18. The integrated circuit of claim 13, wherein the plurality of transmission parameters are time slots and detection of a collision in a particular time slot results in an immediate transfer to a next time slot.

* * * * *